March 2, 1948. I. FISHER 2,436,860
GLOBAL MAP
Filed Feb. 19, 1945 2 Sheets-Sheet 1
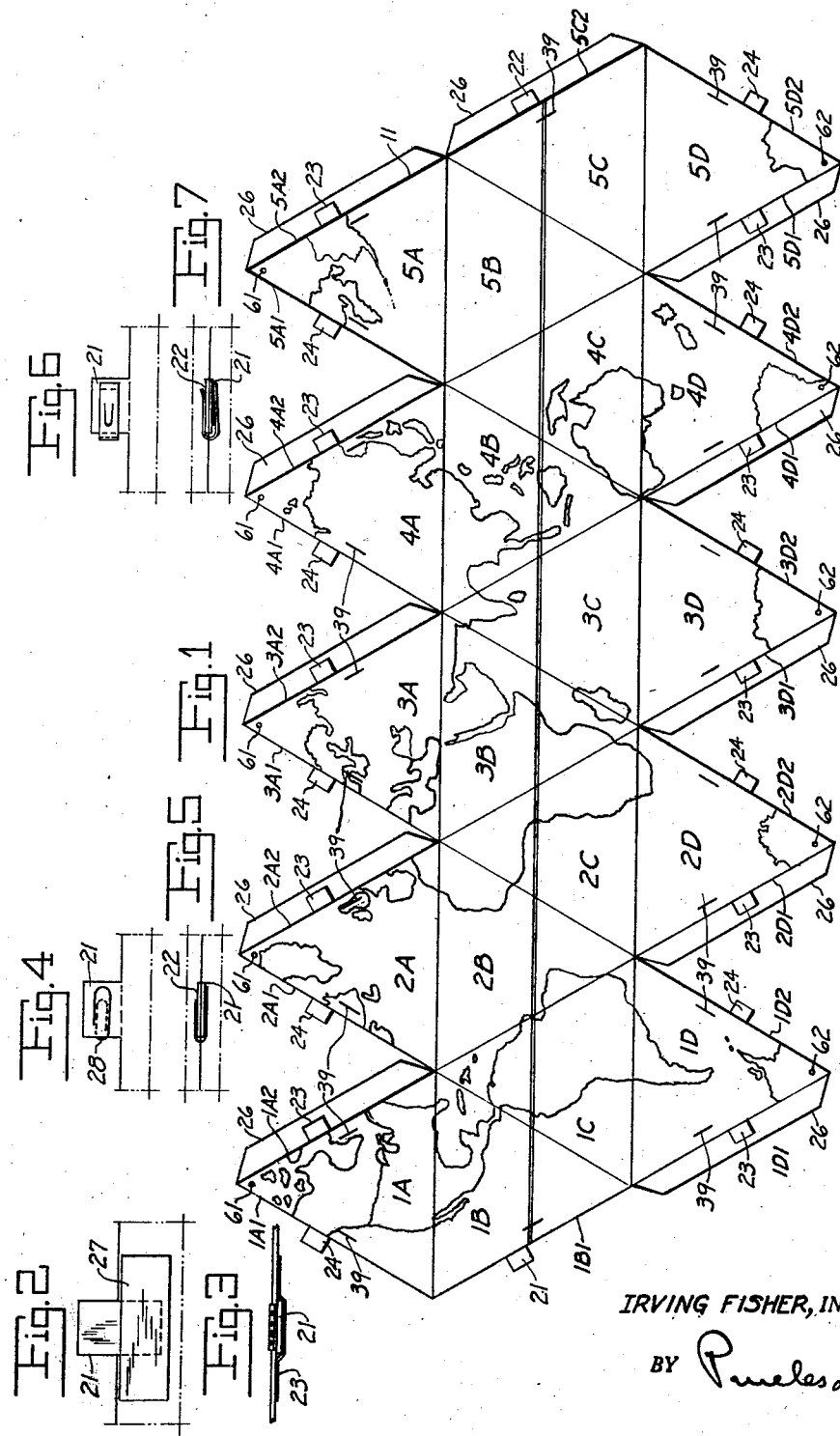
IRVING FISHER, INVENTOR.
BY Pueles a Greene March 2, 1948.  I. FISHER  2,436,860
GLOBAL MAP
Filed Feb. 19, 1945   2 Sheets-Sheet 2
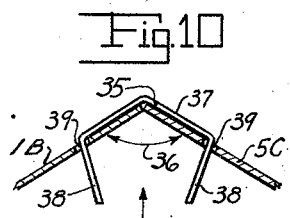
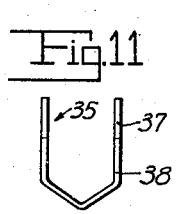
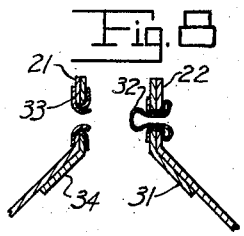
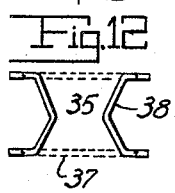
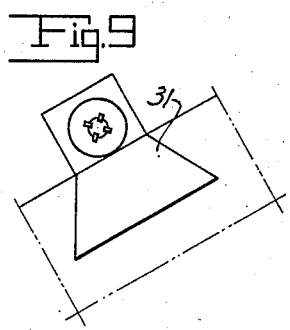
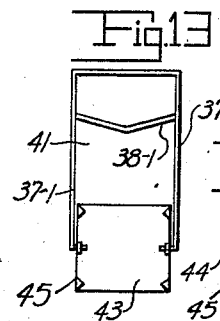
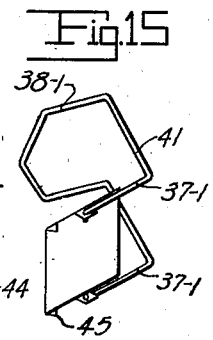
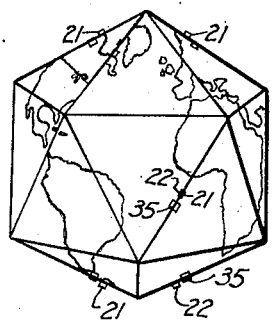
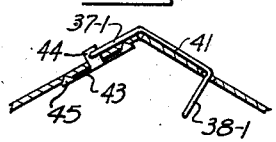
IRVING FISHER, INVENTOR.
BY Pineles & Greene Patented Mar. 2, 1948

2,436,860

UNITED STATES PATENT OFFICE 2,436,860

GLOBAL MAP

Irving Fisher, New Haven, Conn.

Application February 19, 1945, Serial No. 579,590

7 Claims. (Cl. 35—40)

This invention relates to global maps, and it has among its objects an improved global map projected on foldable sheet sections of an icosahedron, which is a regular polyhedron with twenty exterior faces, each constituting an equilateral triangle.

More specifically, among the objects of the invention is a map of the foregoing type, the sheet sections of which constitute parts of a continuous flat sheet structure which may be folded along the separation edges between adjacent sections into a globe-like structure having on the exterior face of each section a component map part of a generally spherical map of the earth, the border edges of the sheet structure being formed of a plurality of pairs of straight conjugate edge sections which are brought into abutment when the sheet structure is folded into global shape, each conjugate edge section having at least one outwardly extending tab bendable along the edge and arranged to overlap the tab of the conjugate edge section so that when a pair of border edges of the sheet structure are brought into abutment, their tabs will overlap and permit gripping of a pair of overlapping tabs by external gripping forces applied from the exterior space surrounding their faces for fastening the border edges in their abutting relation.

The foregoing and other objects of the invention will be best understood from the following description of exemplifications thereof, reference being had to the accompanying drawings wherein Fig. 1 is a plan view of an unfolded globe-like map structure exemplifying one form of the invention;

Fig. 1-A is a perspective view of a globe-like map structure formed of the sheet structure of Fig. 1;

Fig. 2 is a plan view of a border edge portion of an edge section of the map structure of Fig. 1, viewed from the interior side thereof with a tab formed thereon;

Fig. 3 is an edge view of the edge section of Fig. 2;

Fig. 4 is an elevational view of two abutting edge sections of the folded map structure of Fig. 1 showing a clip holding fastened two adjacent overlapping tabs extending from the edge sections;

Fig. 5 is a top view of the elements shown in Fig. 4;

Figs. 6 and 7 are views similar to Figs. 4 and 5 showing the application of a different type of clip for fastening overlapping tabs of abutting edge sections;

Fig. 8 is a cross-sectional view of two abutting folded map sections of Figs. 1 and 1-A with tabs extending from their conjugate edges and fastening means for clampingly joining the overlapped tabs and the adjacent edge sections;

Fig. 9 is a plan view of the inner side of one of the edge sections of Fig. 8;

Fig. 10 is a cross-sectional view of two abutting folded map sections of Figs. 1 and 1-A and a hook-like member forming an interconnection between them;

Fig. 11 is a side view of the hook member of Fig. 10;

Fig. 12 is a view of the hook member of Fig. 10, viewed in the direction of arrow 12 of Fig. 10;

Fig. 13 is an elevational view of a modified form of a hook connection of the type shown in Figs. 10 to 12;

Fig. 13-A is a sectional view showing the hook member of Fig. 13 hooked into place to form a connection between abutting conjugate edges;

Fig. 14 is a plan view of a blank out of which the pivot support of the hook shown in Fig. 13 is formed; and Fig. 15 is a perspective view of the hook member of Fig. 13.

Referring to the exemplification of the invention shown in Figs. 1 and 1-A, it comprises an icosahedron formed of twenty equilateral triangles 1A to 5A, 1B to 5B, 1C to 5C, and 1D to 5D, arranged so that when laid flat in a plane, ten triangles, namely, 1B to 5B and 1C to 5C constitue an elongated continuous strip, to one side of which is joined a set of five triangles 1A to 5A and to the other side of which is joined a set of five triangles 1B to 5B.

The individual triangle sections of the sheet are joined to each other along triangle sides which are creased and form separation edges along which the individual sections may be folded. A sheet with twenty foldable triangles arranged in the manner shown in Fig. 1 may be folded from the flat condition shown in Fig. 1 into a structure approximating a globe or sphere indicated in Fig. 1-A by bringing into abutment the triangle edges 1B1 and 5C2 bounding the central strip formed of the ten triangles 1B to 5B and 1C to 5C, as well as the conjugate outer edges of the five outer triangles 1A to 5A and of the five outer triangles 1D to 5D.

In the sphere-like folded condition of the sheet blank shown in Fig. 1-A, the triangular edges 1B1 and 5C2 constitute the central pair of conjugate edge sections of the blank which are brought into abutment, and similarly, the pairs of triangular edges 1A2—2A1, 2A2—3A1, 3A2—4A1, 4A2—5A1, 5A2—1A1, 1D2—2D1, 2D2—3D1, 3D2—4D1, 4D2—5D1 and 5D2—1D1, each form a pair of conjugate edge sections of the blank which are each brought into abutment when the blank is folded into a spherical structure.

As indicated in Figs. 1 and 1-A, the map of the earth may be readily projected on such icosahedron, for instance, by gnomonic projection procedure. The individual outer faces of the triangular sheet sections 1A ... 1B ... 1C ... 1D ... of such icosahedron will closely approach in area corresponding sections of a spherical globe of the earth placed into the icosahedron so that the center of each icosahedran triangle engages tangentially a point of the globe. This makes it possible to form on each triangle a geographical projection, such as a gnomonic-type projection, of the map of the globe with a greater degree of accuracy and with a lesser degree of distortion than with other sheet systems foldable into a globe. Such global map has the advantage that it may be readily printed in flat form with all sections of the map joined into one compact unit, while enabling folding of the individual triangular sections into a globe-like form and vice versa, particularly if the twenty triangles of the globe structure are formed of stiff sheet material, such as cardboard.

As is well known, gnomonic projections of the globe are formed by rays emanating from the center of the globe and casting the image of points of the globe surface on a plane engaging tangentially a point of the globe. In the icosahedron type of globe, the individual global map sections have formed thereon by gnomonic projections maps which exhibit a lesser degree of distortion than other prior maps of the globe suitable for spreading into a flat condition.

In other words, by projecting the surface of the globe on twenty flat surface elements, each having its own point of tangency, the maximum distortion of the individual map sections is reduced to a minimum and the degree of distortion has a very simple relation to the configuration of each flat area section. Such map exhibits thus not only a lesser degree of distortion, but whatever distortion occurs is distributed in a predetermined exact manner in each of its constituent parts, the region at the center of each equilateral triangle exhibiting no distortion at all, the distortion increasing gradually as the distance from the center of the triangle increases and the maximum distortion occurring at the three vertices of the triangle.

In particular, the maximum linear distortion which occurs at the three vertices of such triangle is 50% in a direction radially from the center and 26% in transverse direction so that the distortion in shape or conformality—that is the ratio of the radial distortion to the transverse distortion—is at the points of maximum distortion only 19%.

On such global map, a straight line within any one triangle always represents a great circle. This advantage is of particular importance to aviators. When on the icosahedron we pass from one of the twenty triangles to an adjacent triangle, there is (in general) a change of apparent direction in the straight line to be followed in order to represent a great circle.

A foldable map of the type shown has a great deal of adaptability and versatility. It may present the central belt of ten connected triangles 1B to 5B and 1C to 5C as a belt around the equator or as a belt around any meridian or any great circle. Depending on the requirements, the point of central interest, for instance, the North Pole or some special region, may be arranged so that it coincides either with the center of an equilateral triangle of the map structure of the invention or with a vertex of such triangle or with a center of an edge of such triangle. Thus, in the case of the map structure shown in the drawings, the North Pole coincides with the vertices of the five triangles 1A to 5A. It may be used for presenting maps of the globes in a variety of manners, among which are the following:

As a belt proceeding obliquely from southwest to northeast or from northwest to southeast; as two hemispheres, either eastern or western, like the stereoscopic or the orthographic projection; or northern and southern, like the polar projections. Special regions may be presented in numerous ways. For instance, the United States may be so presented as to show many round-the-world great circle routes or to show especially the country's relation to all the neighboring triangles, including those on the opposite side of the North Pole.

Such global map makes it also easy to determine the shortest route between any two points on the earth. For instance, a person desiring to map the shortest route from Chicago to Johannesburg, South Africa, may proceed as follows:

Determine the antipode for Chicago on the globe-like structure. Stick a pin radially at the location of Chicago and another at its antipode. Likewise stick in a third pin for Johannesburg and a fourth pin for Johannesburg's antipode. For convenience, rest the globe on one of its faces so as to make the great circle plane of these four pins as nearly horizontal as possible.

Cut out a circle of cardboard with a diameter greater than that of the globe (say 25% greater), and out of this circle cut, in turn, a circular concentric hole with a diameter only slightly larger than that of the globe. Place this cardboard ring thus formed so as to surround the globe resting on the four pins. (If the ring does not touch all four pins, they must have been incorrectly placed.) With a pencil, mark on the globe those points at which the ring crosses some of the edges of the polyhedron. Then, with a ruler, draw a straight line across each face connecting these pencil marks. This can be done either on the wrapped globe or, more accurately, on the unwrapped globe map.

The resulting series of straight lines constitutes the required great circle route between Chicago and Johannesburg and around the globe.

Notwithstanding that many advantages of such foldable icosahedron maps—and the fact that their principle was suggested by Albrecht Dürer back in the sixteenth century—they did not come into practical use because of the difficulties in converting them from their flat unfolded form into their folded spherical shape. Various means for facilitating the conversion of such maps from their flat into spherical shape have been suggested in the past, but none of them proved practical and convenient.

Moreover, once such maps were folded into spherical shape, the various parts either had to be glued together—thereby eliminating the advantage of permitting their unfolding into flat shape—or the various parts were joined and held together by variously arranged tongues and slots which were difficult to handle and also made it impossible to attain any tolerable degree of accuracy in bringing and holding the conjugate edge sections of the sheet blank into their properly aligned abutting relation.

According to the invention, the foregoing difficulties encountered with foldable global maps of the type described are eliminated and their conversion from the unfolded into the folded spherical shape rendered simple and easy by providing the conjugate edge regions of the sheet blank, which are to be brought into abutting relationship, with gripping means which make it possible to hold two adjacent conjugate edge regions gripped by an externally applied gripping force holding the conjugate edges in their abutting relation.

In the exemplification of the invention shown in Fig. 1, this is accomplished by providing the two conjugate edge sections 1B1 and 5C2 each with a tab projection 21, 22 extending from the free edge thereof, so that whenever they are brought into abutment in the spherical form of the blank, the two tabs 21, 22 overlap and provide a double tab grip extending outwardly from the adjacent faces so that an external gripping force may be readily applied from the exterior space surrounding their exposed faces for holding the conjugate edges in their aligned abutting position.

Similarly, each of the other pairs of conjugate edge sections of the blank, such as 1A2—2A1, 2A2—3A1 ... 5A2—1A1, 1D2—2D1 ... 5D2—1D1, are likewise each provided with a pair of tabs 23, 24 arranged so that when the map blank is folded, the tabs 23, 24 extending from each pair of conjugate edge sections of the border sections of the blank are brought into overlapped relation to provide a double tab projection, extending outwardly away from the faces of the adjacent map sections, making it possible to hold each pair of outer map sections in their properly aligned abutting position by external forces applied to the tabs in the region adjacent their faces. Each of the tabs 21, 22, 23, 24 adjoins the adjacent sheet section of the blank along a score or bend line, which permits free bending of the tab relatively to the sheet in such manner that when two overlapping tabs 21, 22 or 23, 24 are gripped on their exterior, the double tab may be bent relatively to the abutting edge regions of the spherical folded map structure, without disturbing the abutting relation of the edge sections.

By providing a foldable icosahedron map with projecting tabs, in the manner described above, the difficulties connected with converting an unfolded map blank into a folded icosahedron are eliminated and the conversion is made easy because each pair of overlapping tabs extending outwardly from the conjugate edge sections of the blank provide outer gripping surfaces which may be easily gripped from the exterior side of the adjacent map faces of conjugate map sections for bringing and holding them in their properly aligned abutting condition without exerting disturbing forces tending to distort or upset their spherically aligned abutting positions.

The tab pairs 21, 22 and 23, 24 may form integral parts of the sheet blank out of which the triangular map sections are formed and they may be cut out from a sheet by a single cutting operation. The map blank, as shown in Fig. 1, may be provided with flaps 26 extending from one edge of each pair of conjugate edge sections of the blank so as to make it possible, if desired, to apply cement to the exposed side of such flap and cement it underneath the edge region of the conjugate section of the blank for permanently converting the blank into a global map, the flaps 26 may be punched as a unit with the parts of the blank out of which the map sections are formed, and the cutting tool may be provided with a cutting edge so that a central portion of the flap shall be provided with an independently bendable tab 23.

Alternatively, the individual tabs may be secured in their appropriate position to the map sections from which they extend, for instance, by cementing them to the underside of the map section in the manner indicated in Figs. 2 and 3.

The sheet section which is provided with a tab may be reinforced, as by cementing to the underside thereof, a reinforcing sheet element 27 of paper or fabric, as indicated in Figs. 2 and 3. The projecting tab, such as 21, may form an integral part of the reinforcing element 27.

Alternatively, a reinforcing element, such as sheet element 27, having an extension of the shape of the tab may be cemented to the underside of a tab extending integrally from the edge of the sheet blank so as to reinforce the tab as well as the edge section of the map blank from which it extends.

The overlapping tabs extending from the conjugate edge sections of the blank provide also a convenient means for fastening and maintaining fastened the conjugate edge sections of the blank in their folded condition, while at the same time permitting quick unfolding of the blank to its flat shape.

Thus, Figs. 4 and 5 indicate how two conjugate edge sections of the map blank may be retained in their spherical folded condition, by placing a simple conventional paper clip 28, of wire, over the pair of overlapping tab projections 21, 22 extending from their edges. It is obviously a simple matter to slip such paper clip over the overlapping tab projections of the blank, holding the two tabs gripped with the fingers of the other hand.

As shown in Figs. 6 and 7, instead of a wire clip of the type indicated in Fig. 4, a conventional sheet metal clip may be used holding the overlapping tabs in their clamping position.

Alternatively, as shown in Figs. 8 and 9, tab projections 21, 22 extending integrally from the blank and reinforced with a sheet element 31, 34 of strong material, such as fabric, may be equipped with male and female snap fastener elements 32, 33 of the familiar type for fastening overlapping tabs of the folded map structure in their overlapped position in which they retain the map structure in the spherical shape. No detailed description of the construction of such snap fastener elements is given herein, as they are familiar in the art, the female fastener element shown being of the type described in Patent 1,783,748, and the male fastener element shown being of the type described in Patent 1,988,331.

In case of a large size map of the type described above, the individual map sections have to be made of heavy wall elements in which case it is desirable to provide additional fastening means for retaining the abutting edge wall sections of the folded map structure in their folded condition.

Figs. 10 to 12 show one form of a hook-like fastener or clip member 35 which is very effective as a fastening element for such foldable map structure. As indicated in Fig. 10, the two conjugate wall sections, such as 1B and 5C, when assembled in their folded abutting condition, form between them an obtuse angle 36. The fastener member 35 may be made of a strip of sheet metal or a wire-like loop as shown having a central yoke member 37 bent to provide two arms enclosing the same obtuse angle 36 as the two abutting sheet sections of the map and extending thereover, the ends of the two angularly-arranged arms of the yoke being provided with hook-like shank projections 38 which engage slots 39 extending through each of the two conjugate wall sections in a direction parallel to their conjugate edges.

The clip 35 may be made of spring metal and its yoke arms enclose the same angle as the abutting wall sections of the folded map structure. The length of each of the arms of the yoke 37 of the clip member 35 is about equal to the distance of the slits 39 from the abutting edges of the wall sections which the yoke arms overlie. The projecting shank elements 38 of the yoke form with the yoke arms 37 an angle such that when such clip member is inserted into the slits, it acts like a hook anchoring the two wall sections in their abutting position and preventing any displacement of the abutting wall sections either in a direction away from each other or longitudinally along their abutting edges.

It will be noted that the distance between the tips of the two shanks 38 is smaller than the distance between their junction portions to the yoke arm 37 which is substantially equal to the distance between the two slits 39 formed in the adjacent wall section. It is therefore necessary to bend the clip 35 slightly apart during insertion and removal from the slits.

In using such clip 35 for retaining two abutting wall sections of the folded map structure, while they are held gripped, for instance, by finger pressure exerted on the overlapping tabs, one may proceed as follows: One of the hook-like shanks 38 of the clip is first inserted in the slit 39 of one of the abutting wall sections, for instance, 1B, shown in Fig. 10. Thereupon—with the junction between the inserted shank 38 and the yoke 37 acting as a hinge—the other shank 38 is bent outwardly until its tip faces the slit 39 of the adjacent wall section, such as 5C, whereupon it is inserted therein, the elastic forces of the deformed clip returning it to its normal position shown in which it exerts strong clamping forces holding the two wall sections in their properly assembled aligned position and preventing displacement between them.

In an analogous manner, the clip may be removed first by withdrawing one shank from one of the slits 39 against the biasing forces exerted by the yoke, whereupon the other shank is removed from the other slit. A clip of the type shown in Figs. 10 to 12 is very effective in retaining the folded map in its true shape of an icosahedron, even if the map is made of heavy wall boards. Obviously, more than one such clip may be provided for each pair of abutting edge sections of the map structure.

In some cases, it may be desirable to provide such foldable map structure with additional shape-stabilizing fastener clips which are permanently affixed to the associated wall elements of the map structure. Figs. 13 to 15 show one form of such fastener clip arrangement.

The clip fastener of Figs. 13 to 15 comprises a hook-like clip member 41 having a yoke element 37—1 and a shank 38—1 extending therefrom, being thus similar to the clip member of Figs. 10 to 12, except for having only one hook shank. The end of the yoke element 37—1, which is without a shank, is hingedly connected to a hinge element 43 which is affixed to one of the wall sections so that the hook shank 38—1 of the clip 41 may be inserted into a slot of the abutting map section, in the same manner as the hook of clip 35 was inserted into such slot after one of its shanks was first inserted into another slot.

The hinge element of the fastener clip shown in Figs. 13 to 15 is indicated as formed of a metal plate 43 arranged to be applied to the underside of the edge region of a wall section on which it is to be mounted. It may be made from a flat blank, shown in Fig. 14, and it has two hinge ears 44 bent to project in vertical direction from the plate through suitable slits in the wall to which it is applied so that the hinge holes formed in the hinge ears may be engaged by the bent end portions of the two yoke arms 37—1 which are to be hingedly supported by the ears in the manner indicated in Figs. 13 and 15.

The hinge plate 43 is also provided with a plurality of teeth 45 which are shaped so as to enter into suitable slits in the sheet wall and be bent over so as to hold the hinge plate firmly clamped to the inner side of the wall section to which it is attached. The hinge pivots of the clip hook 41 may be deformed after insertion into the hinge ears 44 of the hinge plate 43 so that the hook is positively retained therein.

A foldable global map equipped with tab projections extending from the conjugate edge sections for holding them in their abutting positions, may also be provided with a set of junction elements, such as holes or pin heads 61 on the projecting vertices of the set of triangles 1A to 5A and another set of such junction elements 62 on the projecting vertices of the other set of triangles 1D to 5D, so that the two sets of five junction elements 61, 62 may be tied together with two flexible thread-like members, respectively, after the central pair of conjugate edges 1B1 and 5C2 of the central strip or belt have been brought into and fastened in their abutting position. In the form shown in Fig. 1, the junction elements are holes.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a global map: twenty flat equilateral-triangle sheet sections joined along straight separation edges into a continuous generally-flat sheet structure which is foldable along their separation edges into a polyhedron structure of generally global shape; the outer face of each section having thereon a component map part corresponding to one-twentieth part of a generally spherical map of the earth, and adjacent sections representing adjacent map parts of the earth; ten of said sections forming adjoining parts of an elongated continuous strip having parallel opposite sides, and the ten other sections being formed of two sets of five sections extending from the opposite sides of said strip and each side of the strip being formed of five linearly aligned separation edges of its sections; the border edges of said sheet structure being formed of twelve pairs of straight conjugate border edges of conjugate sheet regions which are brought into abutment when said sheet structure is folded into global shape; each conjugate border edge having a tab extending from and bendable along the border edge of the conjugate sheet region so that when a pair of conjugate border edges are brought into abutment their tabs will overlap and form a bendable double tab extending outwardly from the abutting conjugate border edges so that the double tab may be gripped from the exterior side of the polyhedron structure while fastening the conjugate sheet regions thereof in their abutting relation; and releasable fastening elements associated with each pair of conjugate sheet regions for fastening them in their abutting relation.

2. In a global map: twenty flat equilateral-triangle sheet sections joined along straight separation edges into a continuous generally-flat sheet structure which is foldable along their separation edges into a polyhedron structure of generally global shape; the outer face of each section having thereon a component map part corresponding to one-twentieth part of a generally spherical map of the earth, and adjacent sections representing adjacent map parts of the earth; ten of said sections forming adjoining parts of an elongated continuous strip having parallel opposite sides, and the ten other sections being formed of two sets of five sections extending from the opposite sides of said strip and each side of the strip being formed of five linearly aligned separation edges of its sections; the border edges of said sheet structure being formed of twelve pairs of straight conjugate border edges of conjugate sheet regions which are brought into abutment when said sheet structure is folded into global shape; each conjugate border edge having a tab extending from and bendable along the border edge of the conjugate sheet region so that when a pair of conjugate border edges are brought into abutment their tabs will overlap and form a double tab extending outwardly from the abutting conjugate border edges so that the double tab may be gripped from the exterior side of the polyhedron structure while fastening the conjugate sheet regions thereof in their abutting relation; and fastener means for holding a pair of conjugate sheet regions in their abutting relation aligned as parts of a polyhedron so as to prevent disturbance of their alignment; said fastener means including an elastically deformable hook member having a flat yoke element formed of two arms so that the ends of the two arms overlie and engage portions of the conjugate sheet regions; one arm end of said yoke element being hingedly connected to the underlying sheet portion of one of said sheet sections; the other arm end of said yoke element having a flat shank projecting therefrom in a direction generally perpendicular to the surface of the underlying sheet section and engaging a slit formed therein.

3. A global map arrangement as defined by claim 2, in which the two yoke arms enclose an obtuse angle substantially equal to the obtuse angle enclosed by the underlying globally-folded abutting sheet sections.

4. A global map arrangement as defined by claim 2, in which the hook member has two flat shanks projecting from each yoke arm, each shank projecting from the arm in a direction generally perpendicular to the surface of the underlying sheet section of the map.

5. A global map arrangement as defined by claim 2, in which the hook member has two flat shanks projecting from each yoke arm, each shank projecting from the arm in a direction generally perpendicular to the surface of the underlying sheet section of the map and the two yoke arms enclosing an obtuse angle substantially equal to the obtuse angle enclosed by the underlying globally-folded abutting sheet sections.

6. A global map arrangement as defined by claim 1, in which the fastening elements of each pair of conjugate sheet regions are carried by the double tabs of the assembled polyhedron structure.

7. A global map arrangement as defined by claim 1, in which the fastening elements of each pair of conjugate sheet regions form fixed parts of the tabs.

IRVING FISHER.

REFERENCES CITED

The following references are of record in the file of this patent:

UNITED STATES PATENTS

| Number | Name | Date |
| --- | --- | --- |
| 2,160,009 | Walker | May 30, 1939 |
| 1,731,747 | Meyerson | Oct. 15, 1929 |
| 2,142,166 | Zalkind | Jan. 3, 1939 |
| 1,928,025 | McEwan | Sept. 26, 1933 |
| 944,248 | Wilson | Dec. 21, 1909 |
| 1,798,644 | Wheat | Mar. 31, 1931 |
| 2,352,380 | Gingery | June 27, 1944 |
| 2,352,225 | Riddiford | June 27, 1944 |

FOREIGN PATENTS

| Number | Country | Date |
| --- | --- | --- |
| 13,481 | Great Britain | 1851 |
| 161,045 | Great Britain | 1921 |